United States Patent
Schneider et al.

(10) Patent No.: US 8,942,437 B2
(45) Date of Patent: Jan. 27, 2015

(54) ULTRASONIC AREA-ARRAY SENSOR WITH AREA-IMAGE MERGING

(75) Inventors: John K. Schneider, Snyder, NY (US); Jack C. Kitchens, Tonawanda, NY (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 13/107,635

(22) Filed: May 13, 2011

(65) Prior Publication Data

US 2011/0279664 A1 Nov. 17, 2011

Related U.S. Application Data

(60) Provisional application No. 61/334,354, filed on May 13, 2010.

(51) Int. Cl.
*G06K 9/00* (2006.01)
*G06K 9/36* (2006.01)

(52) U.S. Cl.
CPC .......... *G06K 9/0002* (2013.01); *G06K 9/00026* (2013.01)
USPC ........... 382/124; 382/115; 382/125; 382/275; 382/284

(58) Field of Classification Search
USPC ........................... 382/124, 115, 125, 275, 284
See application file for complete search history.

(56) References Cited

U.S. PATENT DOCUMENTS

| | | | | |
|---|---|---|---|---|
| 7,203,347 B2 * | 4/2007 | Hamid | .......................... | 382/124 |
| 7,894,689 B2 * | 2/2011 | Liu et al. | ....................... | 382/284 |
| 8,385,612 B2 * | 2/2013 | Tatara | ............................ | 382/124 |
| 8,634,604 B2 * | 1/2014 | Jahromi | ........................ | 382/124 |
| 2003/0002718 A1 * | 1/2003 | Hamid | ........................ | 382/124 |
| 2003/0152253 A1 | 8/2003 | Wong | | |
| 2003/0179909 A1 * | 9/2003 | Wong et al. | .................... | 382/115 |
| 2005/0180617 A1 * | 8/2005 | Yumoto et al. | ................. | 382/124 |
| 2006/0013453 A1 | 1/2006 | Schneider et al. | | |
| 2006/0056665 A1 | 3/2006 | Iannone | | |
| 2007/0258628 A1 * | 11/2007 | Schneider et al. | ............. | 382/124 |
| 2008/0139938 A1 | 6/2008 | Yang et al. | | |
| 2009/0148012 A1 | 6/2009 | Altmann et al. | | |
| 2009/0154779 A1 * | 6/2009 | Satyan et al. | .................. | 382/124 |
| 2010/0176823 A1 * | 7/2010 | Thompson et al. | ........... | 324/676 |
| 2011/0151928 A1 * | 6/2011 | Montgomery et al. | ..... | 455/556.1 |

OTHER PUBLICATIONS

International Search Report and Written Opinion from the International Searching Authority for PCT/US2011/036507, Aug. 19, 2011, Ultra-Scan Corporation.

* cited by examiner

*Primary Examiner* — Michael A Newman
(74) *Attorney, Agent, or Firm* — Hodgson Russ LLP (57) ABSTRACT

A method and device for using a small area-array sensor to produce a larger image of a biological object is disclosed. In a method according to the invention, the presence of a biological object is detected, and images of the biological object are collected using the area-array sensor. Pixels from at least some of the collected area-images are discarded to produce a set having modified area-images, and the area-images of the set are combined to form an extended image using an image merging algorithm.

21 Claims, 7 Drawing Sheets

Fingerprint   Composite Image of fingerprint

ULTRASONIC AREA-ARRAY SENSOR WITH AREA-IMAGE MERGING

CROSS-REFERENCE TO RELATED APPLICATION

This application claims the benefit of priority to U.S. provisional patent application Ser. No. 61/334,354, filed on May 13, 2010.

FIELD OF THE INVENTION

The present invention relates to fingerprint readers, and more specifically to swipe type fingerprint readers where the digit (e.g. a finger or thumb) is dragged across a surface. The prior art uses a line of sensing elements located below the surface across which the digit is dragged. Information from the line of sensors is combined to form an image of the fingerprint.

BACKGROUND OF THE INVENTION

Since the 1800's fingerprint information has been collected from human digits and hands by means of ink and paper. For the purposes of this document, the term "fingerprint" is used to refer to the skin surface friction ridge detail of a single digit, or part of the friction ridge detail of a digit, or any portion of the skin surface friction ridge up to and including the entire hand. In recent years, various electronic fingerprint scanning systems have been developed utilizing optical, capacitance, direct pressure, thermal and longitudinal-wave methods. Methods based on longitudinal waves, including ultrasound, have proven to be highly accurate, since they are virtually unaffected by the presence of grease, dirt, paint, ink and other substances commonly found on a person's skin.

Use of ultrasound typically employs a piezoelectric transducer that sends an ultrasonic energy wave (often referred to as a "pulse") through a transmitting media. The pulse partially reflects back at each media interface. By knowing the speed of the longitudinal wave, and the time at which an ultrasonic energy pulse was emitted, the distance traveled by the pulse can be determined once the reflected portion of the pulse is detected, and this can be done for each reflecting material interface.

Many of the reflected pulses are not of interest. For example, when a fingerprint is of interest, the pulses reflected by interfaces other than where the digit resides are not of interest. Since pulses reflected by the various interfaces will arrive at different times, it is possible to identify those pulses that are of interest by monitoring a time interval during which the reflected pulse for that interface is expected to arrive. This process is often referred to as "range gating" or "biasing". The reflected pulse received during the expected time is then processed, often by converting it to digital values that represent the signal strength. By graphically displaying this information, a three-dimensional contour map of the object (e.g. a human finger, thumb or other skin surface) that reflected the pulse can be created. With respect to interface surfaces that are not flat, the depth of any gap structure detail (e.g. fingerprint valleys) can be displayed as a gray-scale bitmap image.

Although ultrasound imaging of a fingerprint is superior in detail to a similar image collected by an optical system or other means, the time required to collect a raster scanned acoustic image using a single pixel sweep scanning device is longer than the time needed to collect an optical image of the same size. In such a scanning system, the scanning involves collecting each pixel of image information individually and separately by means of a two-axis mechanical scanning apparatus. There is a need for a device that is faster, but provides the superior detail of an ultrasound system.

Further, there are a number of fingerprint readers employing various techniques of capturing information about a friction ridge for purposes of creating an image of the friction ridge. An inexpensive reader that enjoys utility in many applications, especially small computers, is the swipe sensor. In using a fingerprint swipe sensor, the user moves his digit over a line of sensing elements. For proper operation, the direction in which the digit moves is not parallel to the line of sensing elements. By repeatedly capturing linear images of the digit while the digit is moved over the line of sensing elements, and then combining the linear images, a fingerprint image may be formed. Typically, information is needed about the speed of motion of the digit being swiped in order to properly place the images obtained by the line of sensing elements.

SUMMARY OF THE INVENTION

The invention may be embodied as a method of creating an image of a biological object using an ultrasonic area-array sensor. In one such method the presence of a biological object is detected, a first area-image of the biological object is collected using the sensor, a second area-image of the biological object is collected using the sensor, and the collected area-images are combined to form an extended image using an image merging algorithm. The extended image may depict an area of the surface of the biological object that is larger than the size of the area-array sensor.

The method may be executed in such a way so as to discard a plurality of pixels from at least some of the collected area-images, preferably before the combining step. The discarded pixels may include perimeter pixels of at least one of the collected area-images. In one such method, the biological object may be permitted to move across the area-array sensor between collecting the first area-image and collecting the second area-image. In such a method, the discarded pixels may include pixels depicting a leading edge of the biological object, a trailing edge of the biological object, or both.

A method according to the invention may include collecting one or more subsequent area-images, and combining each subsequent area-image with the extended image using the merging algorithm. Once the biological object is no longer detected, activities associated with collecting area-images may cease. Of course, the method may be executed to collect the first area-image, the second area-image, and the subsequent area-images prior to combining them. In such a "batch" process, the area images are collected before combining occurs. Producing the set having modified area-images also may be done prior to combining. In methods that are in keeping with the invention, the subsequent area-images may be collected until a predetermined number of area-images of the biological object have been collected, or the subsequent area-images may be collected until a predetermined amount of time has elapsed after collecting the first area-image.

The invention may also be embodied as an area-image scanning device comprising an ultrasonic area-array sensor, a processor and a data storage device. The data storage device may be in communication with the processor so that area-images collected via the area-array sensor may be communicated to the data storage device according to instructions provided by the processor. The processor may be in communication with the area-array sensor, and the processor may be configured to instruct the collection of area-images of a biological object using the area-array sensor. The processor may be configured to combine the collected area-images into an extended image using an image merging algorithm. The extended image may depict an area of a surface of the biological object that is larger than the size of the area-array sensor. The processor may be configured to compare the extended image to a reference image, or such a comparison may be performed by a machine other than the processor.

The processor may be configured to stop collecting area-images when the biological object is no longer detected. The processor may be configured to stop collecting area-images when a specific number of area-images have been collected, or after a predetermined amount of time has elapsed after collecting a first area-image. The processor may be configured to collect the area-images prior to combining the collected area-images into an extended image. Also, the processor may be configured to produce, prior to combining, a set having modified area-images by discarding pixels from the collected area-images.

The processor may be configured to discard a plurality of pixels from at least some of the collected area-images before combining the area-images. For example, the discarded pixels may include perimeter pixels of at least one of the collected area-images. In one embodiment of the area-image scanning device, the area-array sensor may be configured to permit a biological object to move across the area-array sensor between collecting the first area-image and second area-image. In such a device, the processor may be configured to discard a plurality of pixels from at least one of the collected area-images, including pixels depicting a leading edge of the biological object, a trailing edge of the biological object, or both.

BRIEF DESCRIPTION OF THE DRAWINGS

For a fuller understanding of the nature and objects of the invention, reference should be made to the accompanying drawings and the subsequent description. Briefly, the drawings are.

FURTHER DESCRIPTION OF THE INVENTION

Figure 1:
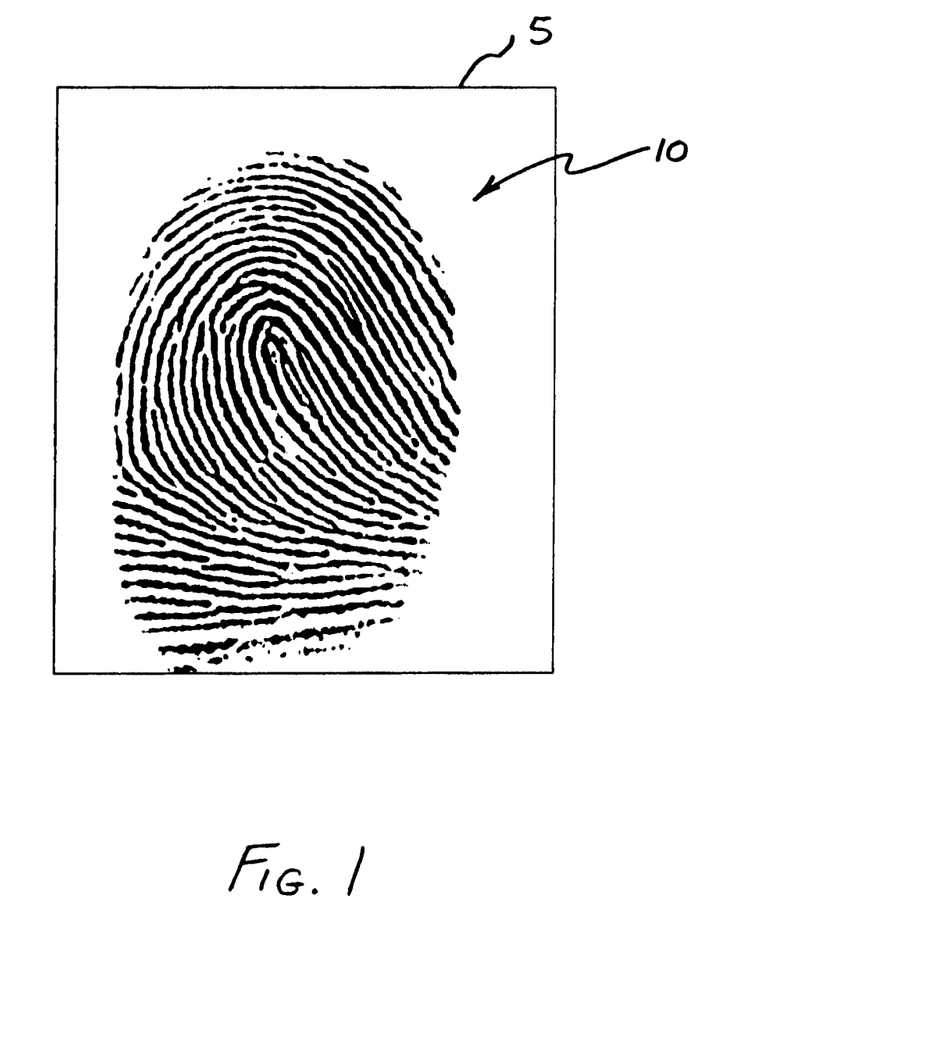
FIG. 1 is a fingerprint image produced from information captured by a scanner (1.0 in×1.25 in.)
Figure 2A:
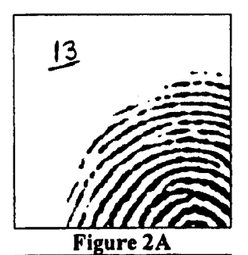
FIGS. 2A through 2L are twelve separate fingerprint images captured using a small area-array fingerprint sensor (0.40 in.×0.40 in.). In keeping with the invention, these area-images may be edge and overlap matched to create an extended fingerprint image similar to that shown in FIG. 1.
Figure 2B:
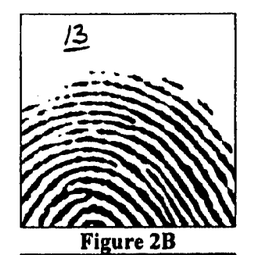
Figure 2C:
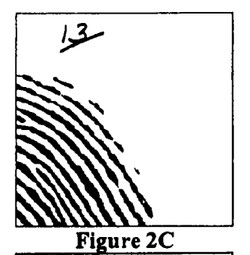
Figure 2D:
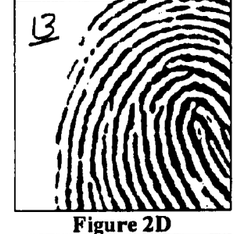
Figure 2E:
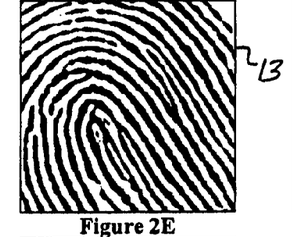
Figure 2F:
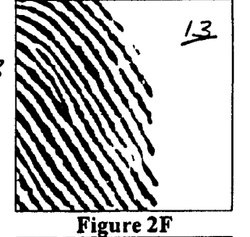
Figure 2G:
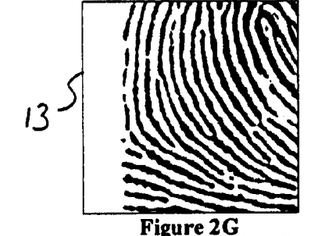
Figure 2H:
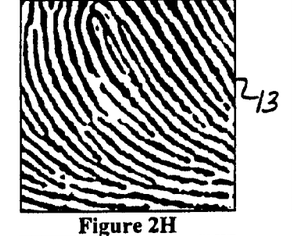
Figure 2I:
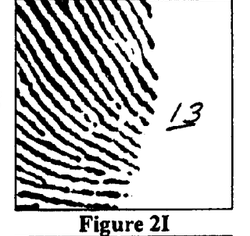
Figure 2J:
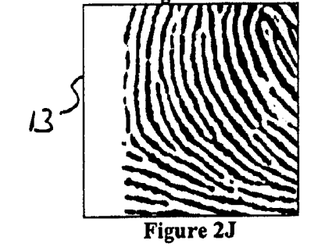
Figure 2K:
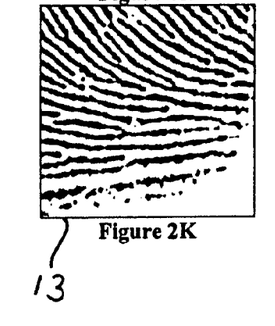
Figure 2L:
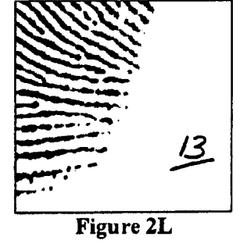

The invention relates to producing an image of a biological object, such as a fingerprint. FIG. 1 is an image 5 of a fingerprint 10 that was produced using an area-array scanner. In an embodiment of the invention, a series of small-area fingerprint area-images 13 are collected, such as those shown in FIGS. 2A-2L, while a biological object, such as a digit, is swiped across an area-array sensor. The collected area-images 13 are analyzed, for example, to edge and overlap match them against each other, so that a composite area-image 16 is created. See FIG. 3. The composite area-image 16 contains more fingerprint information than any single fingerprint area-image 13 collected during the image collection process. Since the algorithms for overlap/edge matching of images are well known to the industry, they will not be elaborated upon in this document other than by the simplest of explanations. The invention makes use of the fact that a collection of images 13 taken of an area of skin can be assembled together to form a larger area-image.

In one embodiment of the invention, portions of an area-image 13, which are likely to be distorted, are ignored or discarded (either of which is referenced herein as "discarded"). For example, while the digit is being swiped over the sensors, the leading edge and the trailing edge (in the direction of the swipe motion) are highly likely to be distorted, because the fat and tissue under the skin bunches up and distorts the friction skin at the leading and trailing edges. Similar distortion of the friction ridge may be encountered at the edges of the friction ridge that contact the imaging surface, but which are not the leading or trailing edges. Those portions of the area-image that are likely to be distorted can be discarded since they are not representative of an undistorted fingerprint area-image.

In one embodiment of the invention, all or part of the perimeter of the area-image 13 are discarded. For example, the leading and trailing edges may be discarded. Discarding a portion of the information provided by the sensors is referred to herein as "edge-discarding" or "discarding an edge" or a similar phrase, even though the information corresponding to the edge may be ignored rather than discarded. Edge-discarding with respect to the leading edge or the trailing edge is not possible with a traditional line-array swipe sensor, because the image information collected by a line-array is only a single line width. Ignoring or discarding information provided by a line-array swipe sensor would eliminate the line of information.

Figure 4:
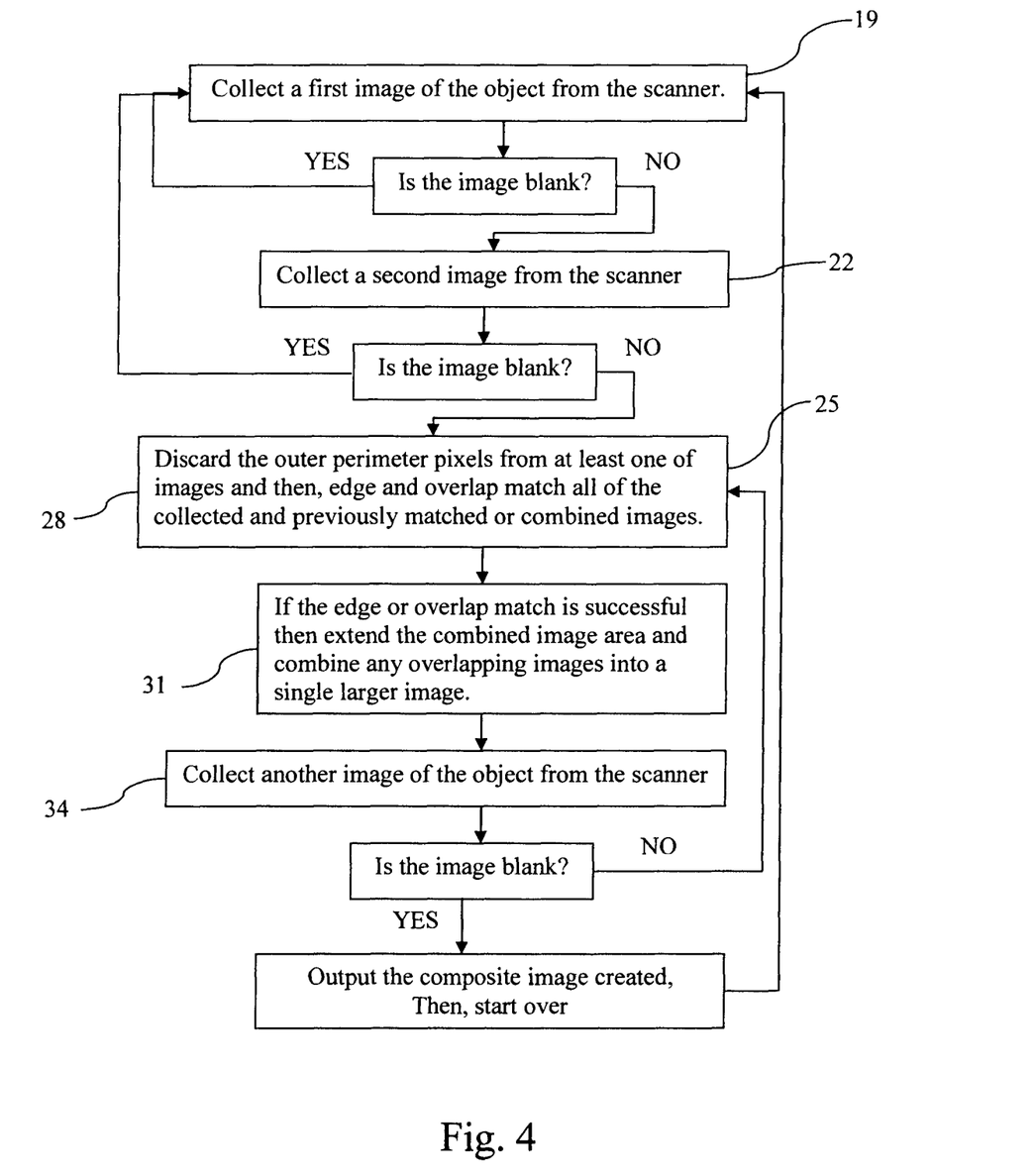
FIG. 4 is a flowchart corresponding to an embodiment of the invention for area-image acquisition and matching that creates a large area-image (an extended image) from a set of smaller area-images.

FIG. 4 depicts steps of a method that is in keeping with the invention. An algorithm for capturing area-images 13 using a small-area swipe sensor, and creating a large-area fingerprint area-image from those smaller area-images 13 is as follows:

A. collect 19 a first fingerprint area-image using the small-area scanner;

B. collect 22 a second fingerprint area-image from the small-area scanner;

C. discard 25 the perimeter pixels from the collected area-images;

D. edge and overlap match 28 one of the modified area-images to another of the modified area-images, or an area-image that is a combination of two or more modified area-images (an "extended image");

E. if the match was successful, combine 31 the area-images into an extended image;

F. collect 34 a subsequent fingerprint area-image from the small-area scanner;

G. if the area-image collected in step F is blank, indicating that the digit has been lifted, then output the extended image;

H. if the subsequent area-image of step F is not blank, then discard the perimeter pixels from the subsequent area-image, go to step D and continue from there.

Figure 3:
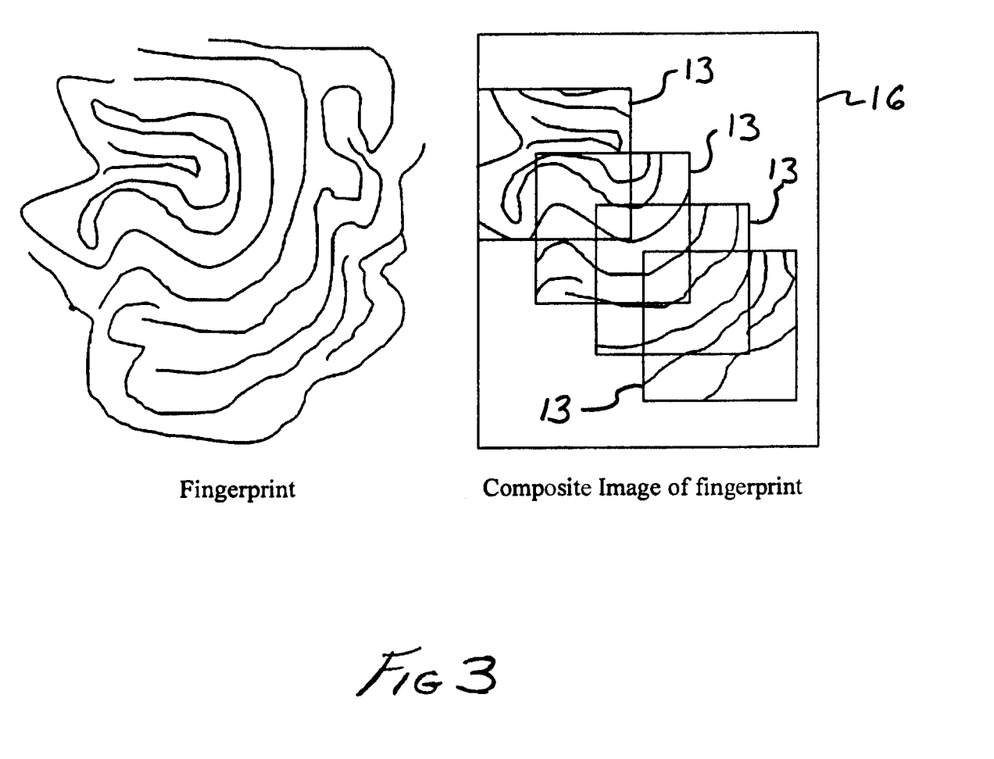
FIG. 3 illustrates several area-images ("component area-images") having overlapping regions being merged to create a new larger area-image (an extended image) using data from the component area-images.

The step C of discarding information 25 (the "perimeter-discarding operation") produced by the outer perimeter pixels may be important. The perimeter-discarding operation 25 may prevent the effects of distorted skin from appearing in the area-image 16 produced by the method. It may be useful to not only discard 25 information derived from the outermost perimeter of pixels, but also to discard 25 information derived from those pixels that are immediately adjacent to the outermost perimeter of pixels (i.e. the "penultimate perimeter"). Additional perimeters of information (i.e. those that lie within the penultimate perimeter) may be discarded 25 in order to provide a more accurate extended area-image 16, and/or to facilitate matching one area-image with another.

It should be noted that the invention may be practiced without discarding perimeters of information, but it may not be wise to do so. For example, if there is a pre-existing database of image information that has not discarded or ignored information derived from the perimeter pixels, such as where the image information was derived from a line-array sensor, then performing a perimeter-discarding operation might not be employed in order that newly acquired images are similarly distorted to facilitate matching to the existing database. Another situation in which perimeter-discarding might not be used exists when the need for high assurance is reduced, for example, when authorizing use of a coupon in a grocery store. Such low-security situations may not justify the added cost associated with edge-discarding. Those added costs may include the time to segregate the pixel edge, and costs associated with additional memory to perform edge-discarding.

Also, if the digit is swiped along a known axis, the invention may be practiced so as to discard 25 only the leading and trailing edges of information, rather than the perimeter of information. In this manner, the invention may be used to discard information corresponding to those areas which are most likely to be distorted. Such embodiments may require a means for determining the direction in which the digit is swiped, such as through software, or by providing physical barriers which force a digit to be swiped in a particular direction, or along a particular axis.

Figure 5:
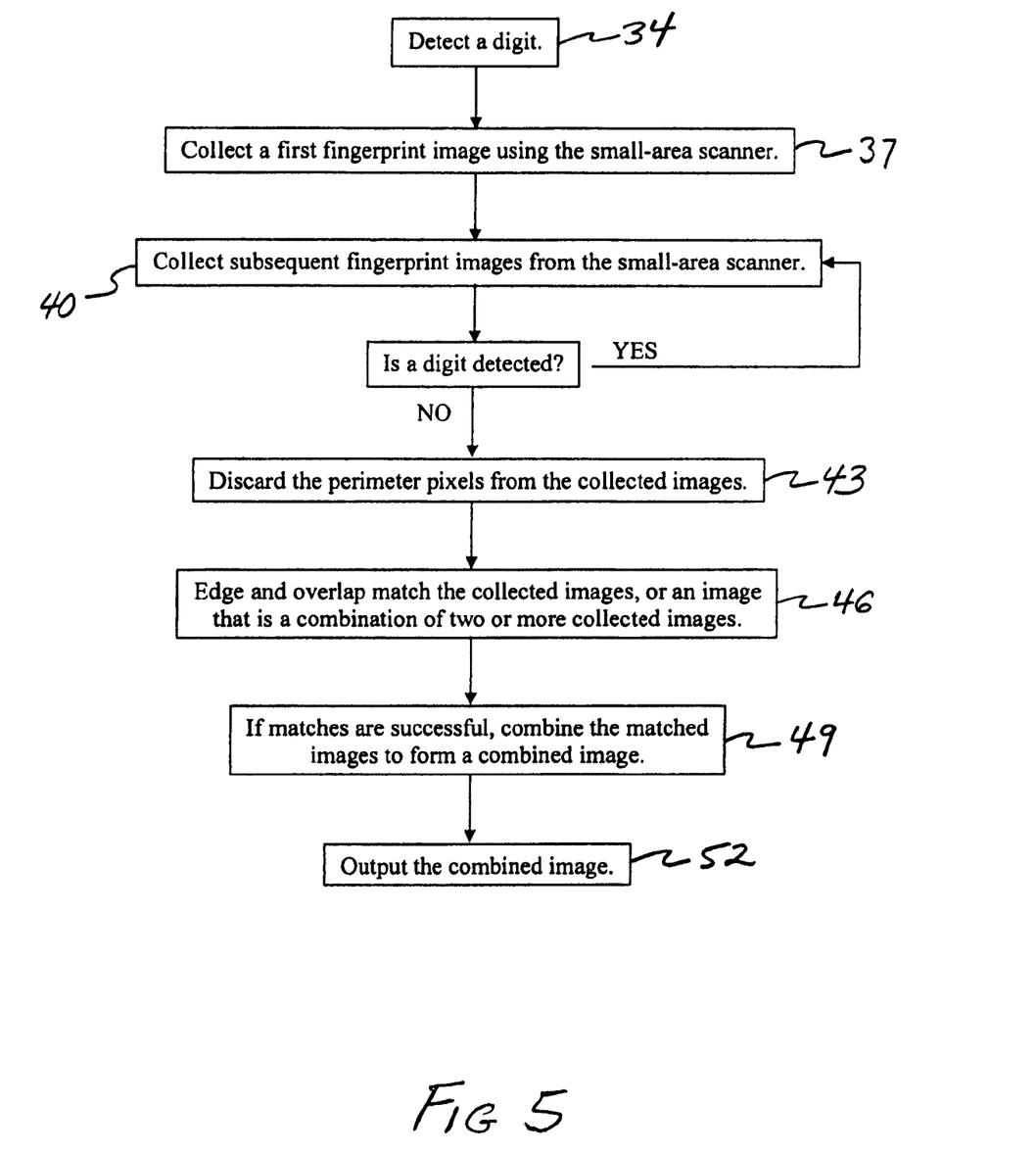
FIG. 5 is a flowchart corresponding to another embodiment of the invention for area-image acquisition and matching that is needed to create a large area-image (an extended image) from a set of smaller area-images.

The invention may be implemented as a batch process. In such an embodiment, more than two area-images are collected (previously, steps 19, 22, 34) before edge manipulation or edge/overlap matching 28 occurs. One variation of this would be to collect (previously, steps 19, 22, 34) all the area-images that will be utilized, and then proceed to perform an edge/overlap matching and combination process (previously, steps 28, 31) to produce the extended image. In such a batch method, a microprocessor may be used to acquire (previously, steps 19, 22, 25) the area-images first, and then match 28 the area-images second. FIG. 5 depicts such a method. In FIG. 5 there is shown an algorithm for such a batch process in which area-images are captured using a small-area swipe sensor, and creating a large-area fingerprint area-image from those smaller area-images. Such a method may be carried out as follows:

AA. detect 34 a digit;
BB. collect 37 a first fingerprint area-image using the small-area scanner;
CC. collect 40 subsequent fingerprint area-images from the small-area scanner, and repeat until the digit is no longer detected;
DD. discard 43 the perimeter pixels from the collected area-images;
EE. edge and overlap match 46 the collected area-images, or an area-image that is a combination of two or more collected area-images;
FF. if matches are successful, combine 49 the matched area-images to form a combined area-image;
GG. output 52 the combined area-image, so that it can be (for example) stored and/or reviewed.

Figure 6:
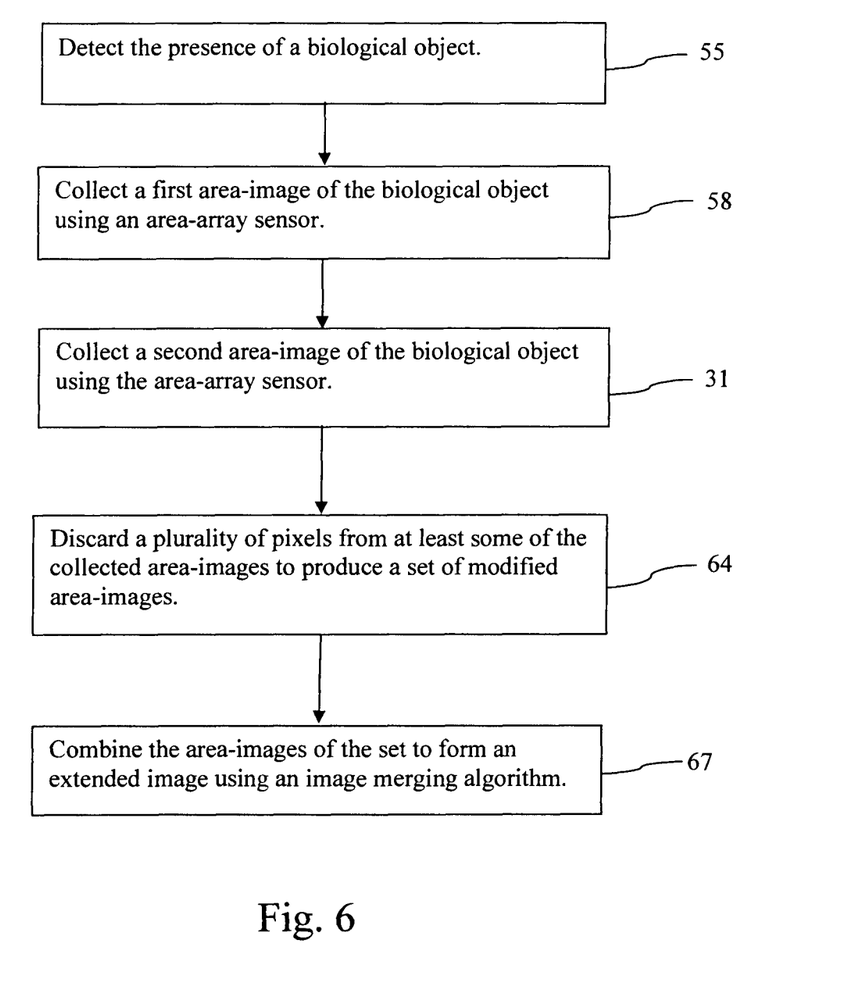
FIG. 6 is a flowchart of a method according to the invention.

Having provided an overview of how the invention might be embodied, additional information about the invention is provided below. With reference to FIG. 6, one such method according to the invention is described. An area-image of a biological object is created using an ultrasonic area-array sensor. Initially, the presence of a biological object may be detected, which may include merely providing an indication (e.g. pushing a "start" button) that a biological object is present on the platen of an ultrasound scanner. Of course, more sophisticated methods of detecting the presence of a biological object may be employed. A first area-image of the biological object is collected 58 using the area-array sensor, and a second area-image of the biological object is collected 61 using the area-array sensor. At least one of the collected area-images is modified 64 by discarding a plurality of pixels to produce a first modified area-image from the first collected area-image, and possibly a second modified area-image from the second collected area-image. The modified area-images may be included in a set of area-images, some or all of which have been modified. If the second collected area image is not modified, it may be included in the set so that it can be combined in a later step. The area-images of the set may be combined 67 to form an extended image using an image merging algorithm. The step of combining may include edge and overlap matching, followed by merging the data of the images to produce a data set that can be used to depict the extended image on a computer monitor. The extended image may depict an area of a surface of the biological object that is larger than the size of the area-array sensor.

Subsequent area-images may be collected (a) until the biological object is no longer detected, (b) until a predetermined number of area-images of the biological object have been collected, or (c) until a predetermined amount of time has elapsed after collecting the first area-image. Pixels of the subsequent area-images may be discarded to produce additional modified area-images, which may be included in a set having modified area-images. If it is determined that a subsequent area-image should not be modified, it may be included in the set so that it can be combined in a later step.

Collection of the subsequent area-images may be performed prior to combining the area-images of the set. Furthermore, prior to combining the area-images of the set, pixels may be discarded from at least some of the subsequent area-images, and these modified subsequent area-images, along with any subsequent area-images that were determined not to need discarding of pixels, may be added to the set having modified area-images. In this manner, the collection of area-images and/or the modification of area-images may be performed prior to combining area-images of the set. As such, a method according to the invention, or parts thereof, may be executed as a "batch" process.

The discarded pixels may include perimeter pixels of at least one of the collected area-images. In one method according to the invention, the biological object is moved across the area-array sensor while area-images are collected, and then during the step of discarding the pixels, the pixels depicting the leading edge of the biological object, the trailing edge of the biological object, or both, are discarded. In this manner, those portions of the collected images that are most likely distorted will be discarded, thereby improving the quality of the extend image and facilitating the combination of area-images to produce the extended image.

Figure 7:
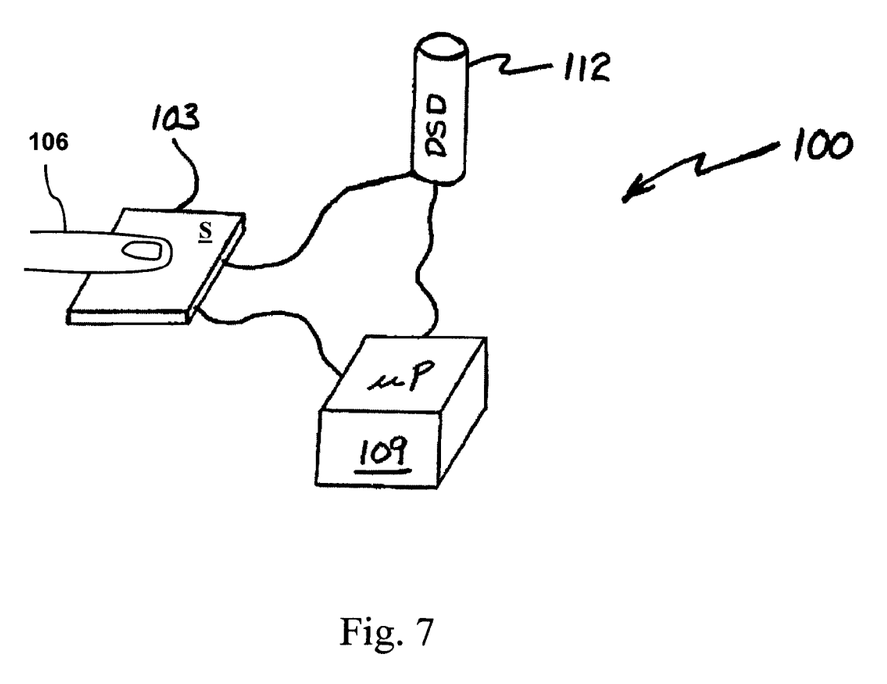
FIG. 7 is a schematic of a device according to the invention.

FIG. 7 depicts a biological object scanning device 100 that is in keeping with the invention, and may be used to execute a method that is in keeping with the invention. For example, an extended image may be created using such a device, and that extended image may depict an area of a surface of the biological object that is larger than the size of the area-array sensor. Such a scanning device 100 may have an ultrasonic area-array sensor 103 that permits a biological object 106 to be moved across the sensor 103, and a processor 109 that is in communication with the area-array sensor 103. The processor may be configured to:
  (a) instruct the collection of area-images of a biological object 106 using the area-array sensor 103,
  (b) discard a plurality of pixels from at least some of the collected area-images to produce a set having modified area-images; and
  (c) instruct combining the area-images in the set to form an extended image using an image merging algorithm.

To configure the processor 109 to perform these and other actions, the processor 109 may be programmed or constructed to accomplish these actions. In such a scanning device 100, the processor 109 may be configured to compare the extended image to a reference image, or such a comparison may be tasked to a different device.

A data storage device 112 may also be included. The data storage device 112 may be in communication with the processor 109, and the data storage device 112 may be used to store collected area-images, or modified area images, or both.

The processor 109 may be configured to stop instructing the collection of area-images when the biological object is no longer detected, or when a specified number of area-images of the biological object are collected, or when a predetermined amount of time has elapsed after collecting a first area-image. Also, to facilitate "batch" processing, the processor 109 may be configured to collect the area-images prior to combining the modified area-images into the extended image.

As suggested above, the processor 109 may discard pixels that are part of the perimeter of a collected area-image. For example, those pixels depicting a leading edge of the biological object, a trailing edge of the biological object, or both may be discarded.

It will now be recognized that the present invention is a significant improvement over line-array sensors. For example, when using the invention, it is not necessary to have information about the speed of the digit being swiped. Also, some embodiments of the invention do not require the digit to be swiped in a known direction.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

What is claimed is:

1. A method of creating an area-image of a biological object using an ultrasonic area-array sensor comprising:
  detecting the presence of a biological object;
  collecting a first area-image of the biological object using the area-array sensor, the collected first area-image having perimeter pixels;
  collecting a second area-image of the biological object using the area-array sensor, the collected second area-image having perimeter pixels;
  identifying outer perimeter pixels of the collected area-images;
  discarding at least some of the identified outer perimeter pixels in order to produce a set of collected area-images having modified collected area-images; and then
  combining the modified collected area-images of the set to form an extended image using an image merging algorithm.

2. The method of claim 1, wherein the extended image depicts an area of a surface of the biological object that is larger than the size of the area-array sensor.

3. The method of claim 1, further comprising:
  collecting subsequent area-images until the biological object is no longer detected;
  discarding at least some outer perimeter pixels from each of the subsequent collected area-images to produce additional modified collected area-images; and
  including the additional modified collected area-images in the set.

4. The method of claim 1, further comprising:
  collecting subsequent area-images until a predetermined number of collected area-images of the biological object have been collected;
  discarding at least some outer perimeter pixels from each of the subsequent collected area-images to produce additional modified collected area-images; and
  including the additional modified collected area-images in the set.

5. The method of claim 1, further comprising:
  collecting subsequent area-images until a predetermined amount of time has elapsed after collecting the first area-image;
  discarding at least some outer perimeter pixels from each of the subsequent collected area-images to produce additional modified collected area-images; and
  including the additional modified collected area-images in the set.

6. The method of claim 1, further comprising:
  collecting subsequent area-images prior to combining modified collected area-images of the set;
  discarding at least some outer perimeter pixels from each of the subsequent collected area-images to produce additional modified collected area-images; and
  including the additional modified collected area-images in the set.

7. The method of claim 1, further comprising permitting the biological object to be moved across the area-array sensor between collecting two of the area-images.

8. The method of claim 7, wherein identifying outer perimeter pixels includes identifying pixels depicting a leading edge of the biological object, and discarding at least some of the identified outer perimeter pixels includes discarding pixels depicting a leading edge of the biological object.

9. The method of claim 7, wherein identifying outer perimeter pixels includes identifying pixels depicting a trailing edge of the biological object, and discarding at least some of the identified outer perimeter pixels includes discarding pixels depicting a trailing edge of the biological object.

10. A biological object scanning device comprising:
  an ultrasonic area-array sensor;
  a processor, in communication with the area-array sensor, the processor configured to:
    (a) instruct the collection of area-images of a biological object using the area-array sensor, the collected area-images having perimeter pixels,
    (b) identify outer perimeter pixels of the collected area-images;
    (c) discard at least some of the identified outer perimeter pixels in order to produce a set of collected area-images having modified collected area-images; and then (d) instruct combining the modified collected area-images in the set to form an extended image using an image merging algorithm;

a data storage device in communication with the processor to store collected area-images, or modified collected area images, or both.

11. The device of claim 10, wherein the processor is configured to compare the extended image to a reference image.

12. The device of claim 10, wherein the extended image depicts an area of a surface of the biological object that is larger than the size of the area-array sensor.

13. The device of claim 10, wherein the processor is configured to stop instructing collecting area-images when the biological object is no longer detected.

14. The device of claim 10, wherein the processor is configured to stop instructing collecting area-images when a specified number of collected area-images have been collected.

15. The device of claim 10, wherein the processor is configured to stop instructing collecting area-images when a predetermined amount of time has elapsed after collecting a first area-image.

16. The device of claim 10, wherein the processor is configured to collect the area-images prior to combining the modified collected area-images into the extended image.

17. The device of claim 10, wherein the area-array sensor is configured to permit the biological object to be moved across the area-array sensor.

18. The device of claim 17, wherein the processor is configured to identify outer perimeter pixels by identifying pixels depicting a leading edge of the biological object, and the processor is configured to discard outer perimeter pixels by discarding pixels depicting a leading edge of the biological object.

19. The device of claim 17, wherein the processor is configured to identify outer perimeter pixels by identifying pixels depicting a trailing edge of the biological object, and the processor is configured to discard outer perimeter pixels by discarding pixels depicting a trailing edge of the biological object.

20. The method of claim 1, wherein the outer perimeter pixels include pixels from a penultimate perimeter.

21. The method of claim 10, wherein the outer perimeter pixels include pixels from a penultimate perimeter.

\* \* \* \* \*